W. TSCHUDY.
MEASURING DEVICE.
APPLICATION FILED SEPT. 10, 1915.

1,274,635.

Patented Aug. 6, 1918.

WITNESSES:
Fred H. Miller
J H Procter

INVENTOR
William Tschudy
BY
Wesley G. Carr
ATTORNEY

UNITED STATES PATENT OFFICE.

WILLIAM TSCHUDY, OF WILKINSBURG, PENNSYLVANIA, ASSIGNOR TO WESTINGHOUSE ELECTRIC AND MANUFACTURING COMPANY, A CORPORATION OF PENNSYLVANIA.

MEASURING DEVICE.

1,274,635.   Specification of Letters Patent.   Patented Aug. 6, 1918.

Application filed September 10, 1915. Serial No. 50,077.

*To all whom it may concern:*

Be it known that I, WILLIAM TSCHUDY, a citizen of the Swiss Republic, and a resident of Wilkinsburg, in the county of Allegheny and State of Pennsylvania, have invented a new and useful Improvement in Measuring Devices, of which the following is a specification.

My invention relates to measuring devices and particularly to means for accurately indicating variations in temperature and pressure.

The object of my invention is to provide a device of the above indicated character that may be used either for accurately indicating the variations in temperature to which the device is subjected or the degree of vacuum or internal pressure in the device or in a device to which it is connected.

I have determined, by experiment, that, if a resistor is disposed in an evacuated vessel and is supplied with current from a source of constant electromotive force, the resistance of the resistor will change in accordance with the temperature to which the vessel is subjected. I have determined also that, if the vessel is maintained at a constant temperature and the degree of vacuum changes, the resistance of the resistor changes in accordance with the degree of vacuum.

I utilize the above mentioned characteristic, that the resistance will change in accordance with changes in temperature and pressure, by locating a thermo-couple in the vessel and connecting its junction to the resistor and by providing a convenient and accurate means for indicating the thermal-electromotive force of the thermo couple, which is proportional to either the temperature or the pressure within the vessel.

Figure 1:
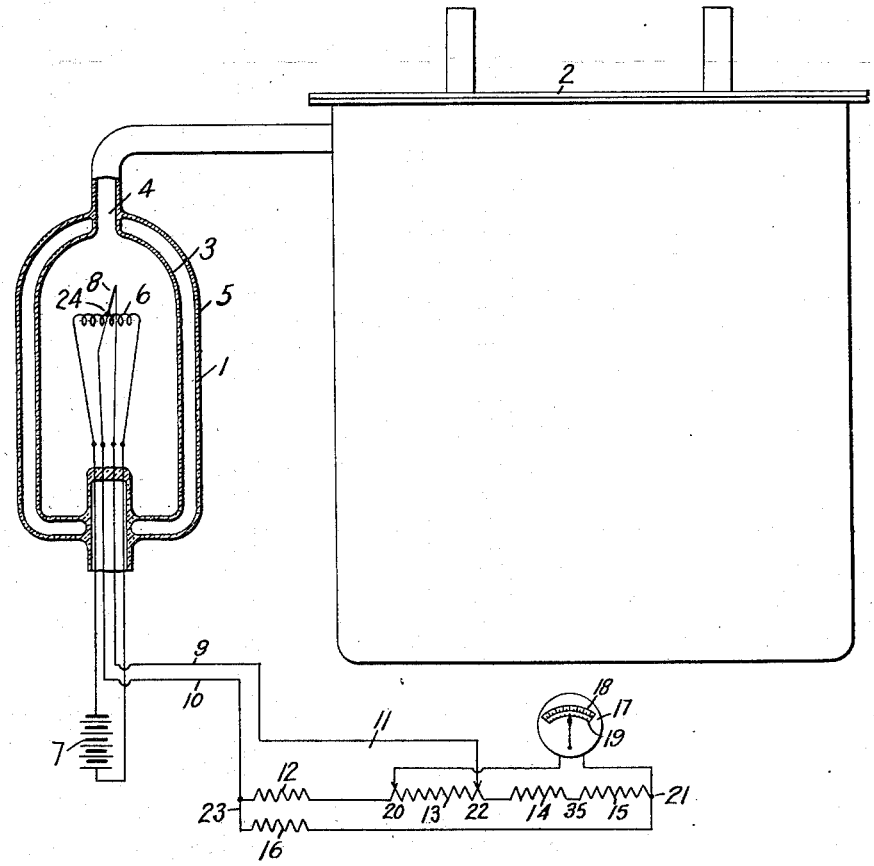
Figure 2:
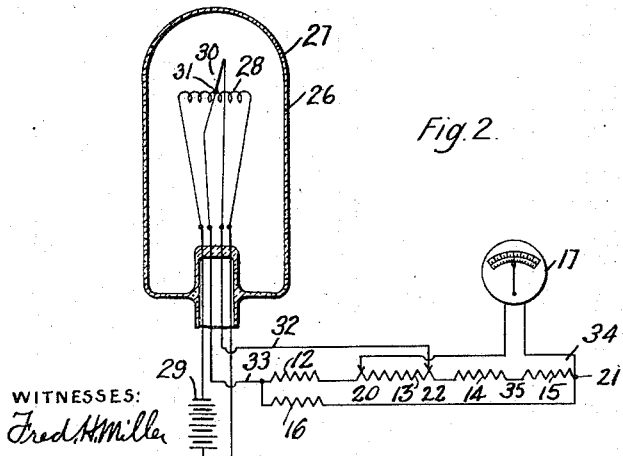

In the accompanying drawings, Figure 1 is a diagrammatic view of a measuring device embodying my invention and illustrating the application of the same for determining internal pressure or the degree of vacuum, and Fig. 2 is a diagrammatic view of my invention illustrating the same as applied for determining changes in temperature.

In Fig. 1 of the drawings, a vacuum gage 1 is provided for the purpose of determining the degree of vacuum or the internal pressure of a mercury vapor rectifier 2. The vacuum gage 1 comprises an inner vessel 3 having an orifice 4 that communicates with the interior of the rectifier 2. An outer vessel 5 is disposed around the inner vessel 3 for the purpose of insulating the vessel 3 from changes in the external temperature, the space between the vessels 3 and 5 being evacuated of air. Within the vessel 3 is disposed a winding 6 that is operatively connected to a source 7 of constant potential. A thermo-couple 8, consisting of two dissimilar metals, such as iron and constantan, is soldered or welded, at one junction 24, to the winding 6, which may be formed of platinum or any other similar material. The conductors 9 and 10 of the thermo-couple 8 are operatively connected to a bridge 11 that is used to determine the thermal electromotive force of the couple.

The bridge 11 is a modified form of Kohlrausch bridge and comprises a plurality of resistors 12, 13, 14, 15 and 16 and an indicating instrument 17 having two scales 18 and 19. The instrument 17 is connected to the points 20 and 21 that are located between the resistors 12 and 13 and 15 and 16, respectively. The conductor 9 is adapted to be connected either to a point 22 between the resistors 13 and 14 or to a point 35 between the resistors 14 and 15, depending upon which scale of the instrument 17 is to be used, and the conductor 10 is connected to a point 23 between the resistors 12 and 16. By such connections, small variations in the thermal electromotive force may be readily indicated on the scales 18 and 19, depending upon the connection of the conductor 9 to the bridge. That is, for low temperatures and pressures, the conductor 9 is connected to point 22, and for relatively high temperatures, to the point 35.

If the vessel 3 is maintained at a constant temperature and the winding 6 is supplied with energy from a source of constant potential, the pressure within the vessel 3 remaining constant, the resistance of the winding 6 will be constant and, consequently, a constant amount of current will traverse the winding 6. The current traversing the winding 6 heats the junction of the thermo-couple 8 to a predetermined temperature, thereby generating a constant thermal-electromotive force that may be indicated by the instrument 17. However, if the vacuum or the internal pressure of the rectifier 2 and the vessel 3 is changed, the external temperature remaining constant, the resistance of the winding 6 rapidly responds to the changing pressure, and more or less current traverses the same, depending upon the relative change in pressure, to thus heat the junction of the thermo-couple 8 in accordance with the internal pressure and thereby cause the instrument 17 to indicate the internal pressure of the rectifier 2.

It will be understood that, when the junction of the thermo-couple 8 is heated, a thermal-electromotive force will be generated that is proportional to the difference in temperature between the junction 24, that is heated, and the terminals of the conductors 9 and 10 which, in the present case, are assumed to be maintained at a substantially constant lower temperature. This thermal-electromotive force is impressed upon the bridge 11, and the potential measuring instrument 17 is so connected across the resistors that the potential drop therein will vary in accordance with the thermo-electromotive force generated. That is, the bridge 11 is merely a modified form of Kohlrausch bridge wherein a calibrated indicating instrument having two scales is employed which is adapted to have substantially equally sensitive indications on either scale.

In Fig. 2 of the drawings, a temperature-measuring device 26 comprises an evacuated vessel 27 in which is disposed a winding 28 of platinum or other similar material that is supplied with energy from a source 29 of constant potential. A thermo couple 30, comprising two dissimilar metals, such as iron and constantan, is disposed in the vessel 27, and the junction 31 thereof is operatively connected to the winding 28. The conductors 32 and 33 of the thermo-couple 30 are connected to a bridge 34 substantially as are the conductors 9 and 10 in the bridge 11 shown in Fig. 1 of the drawings.

Assuming that the internal pressure of the vessel 27 is substantially constant and that the temperature external to the vessel 27 is constant, constant current will traverse the winding 28 to heat the junction 31 of the thermo-couple 30 and thereby cause the indicating instrument 17, if properly calibrated, to indicate the value of the external temperature. If the external temperature varies, the resistance of the winding 28 will rapidly respond to the temperature changes, and, consequently, more or less current will traverse the winding 28 to thereby heat the junction 31 of the thermo-couple 30, in accordance with the temperature, and cause the instrument 17 to indicate the external temperature.

The bridges 11 and 34 are provided with a plurality of resistors and with a potential-measuring instrument having a plurality of scales so that the vacuum gages or temperature-measuring instruments may be utilized over widely different ranges. That is, if the conductors 9 and 32 of the thermo-couples 8 and 30, respectively, are connected to a point 35 between the resistors 14 and 15 instead of the point 22, less proportional current will traverse the windings of the instrument 17, and, consequently, if a different scale is used, higher pressures and temperatures may be indicated with the same accuracy with which small pressures and temperatures are indicated.

My invention is not limited to the particular construction illustrated, as many modifications may be made therein without departing from the spirit and scope of the invention as set forth in the appended claims.

I claim as my invention:

1. A pressure-measuring device comprising a containing vessel adapted to have internal pressures of any value, a winding within said containing vessel, a source of constant electromotive force operatively connected to the winding, thermal-responsive means associated with the winding, and means for indicating the response of the thermal-responsive means, said indication being a measure of the pressure within the vessel.

2. A measuring device comprising a containing vessel adapted to have internal pressures of any value, a winding within said containing vessel, said winding being supplied with current from a source of constant electromotive force, thermo-electric means operatively connected to the winding, and means for indicating the thermal-electromotive force of the thermo-electric means, said indication being a measure of the pressure within the vessel or the temperature to which the vessel is subjected.

3. A measuring device comprising a vessel from which the air has been exhausted, a winding within the vessel that is heated by current from a source of constant electromotive force, a thermo-couple operatively associated with the winding, and means for indicating the thermo-electromotive force of the couple, said thermo-electromotive force being an indication of the temperature to which the vessel is subjected.

4. A temperature-measuring device comprising a vessel adapted to be subjected to the temperature to be determined, said vessel being maintained at a predetermined degree of vacuum, a winding disposed within the vessel, means for supplying current of a constant potential to the said winding, a thermo-couple operatively associated with the winding, and means for determining the thermal-electromotive force of the couple.

5. A temperature-measuring device comprising a vessel adapted to be subjected to the temperature to be determined, said vessel being maintained at a predetermined degree of vacuum, a winding disposed within the vessel, means for supplying current of a constant potential to the said winding, a thermo-couple having one junction connected to the winding, and a measuring instrument for determining the thermal-electromotive force of the thermo-couple, said thermal-electromotive force being a measure of the temperature to be determined.

In testimony whereof, I have hereunto subscribed my name this 25th day of Aug., 1915.

WILLIAM TSCHUDY.